G. W. PEARCE.
HEAT REGULATOR AND DISTRIBUTER.
APPLICATION FILED MAR. 16, 1915.
1,167,516.
Patented Jan. 11, 1916.
2 SHEETS—SHEET 1.
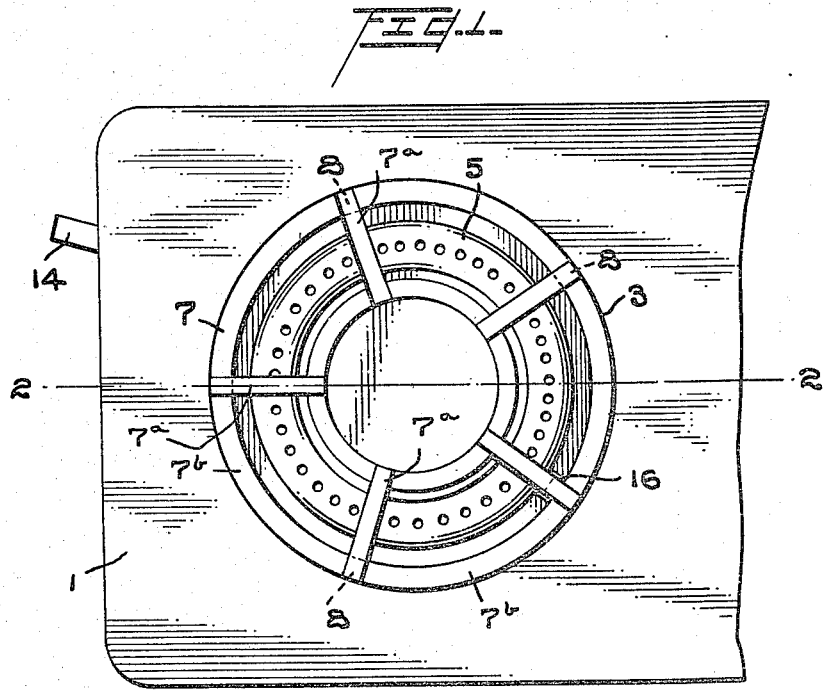
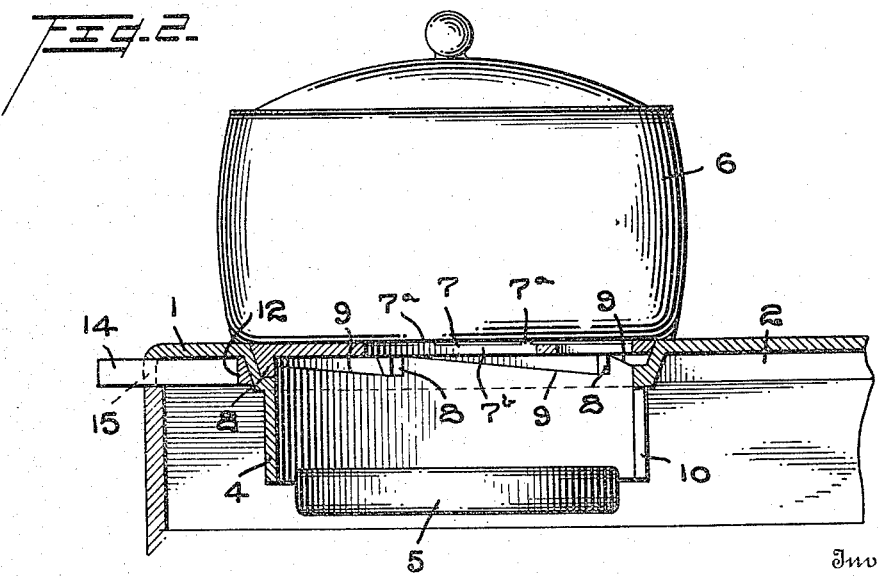

G. W. PEARCE.
HEAT REGULATOR AND DISTRIBUTER.
APPLICATION FILED MAR. 16, 1915.
1,167,516.
Patented Jan. 11, 1916.
2 SHEETS—SHEET 2.
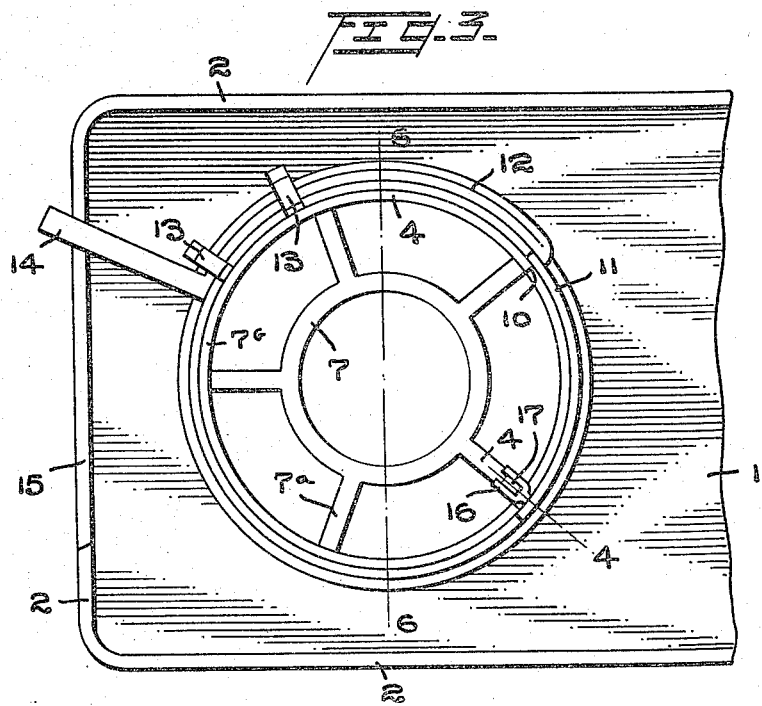
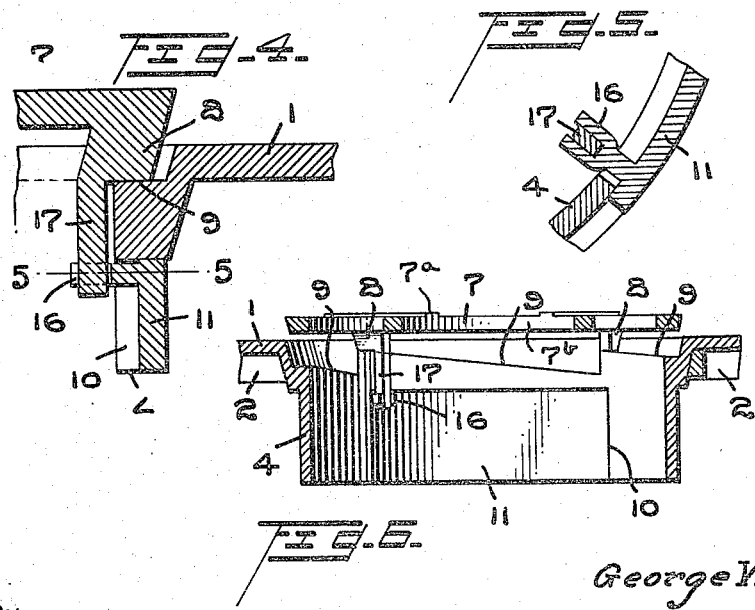
Inventor
George W. Pearce,
By Joshua R. H. Potts.
Attorney
Witnesses

UNITED STATES PATENT OFFICE.

GEORGE W. PEARCE, OF PHILADELPHIA, PENNSYLVANIA.

HEAT REGULATOR AND DISTRIBUTER.

1,167,516.  Specification of Letters Patent.  Patented Jan. 11, 1916.

Application filed March 16, 1915. Serial No. 14,678.

*To all whom it may concern:*

Be it known that I, GEORGE W. PEARCE, a citizen of the United States, residing at Philadelphia, in the county of Philadelphia and State of Pennsylvania, have invented certain new and useful Improvements in Heat Regulators and Distributers, of which the following is a specification.

My invention relates to improvements in heat regulators and distributers, and more particularly to an improved top plate designed for use in connection with gas burners, the object of the invention being to provide an improved mounting for a utensil supporting grid which will permit the grid to be elevated above the surface of the plate to allow an enveloping heat around the utensil or permit the grid to be lowered, so that the utensil will rest upon the plate and prevent the enveloping heat, utilizing only the direct heat at the bottom.

A further object is to provide an improved top plate of the character stated with improved means for controlling the heat from the burner, utilizing the entire heat from the burner or only a part of the same as desired.

With these and other objects in view, the invention consists in certain novel features of construction and combinations and arrangements of parts as will be more fully hereinafter described and pointed out in the claims.

In the accompanying drawings: Figure 1 is a fragmentary top plan view illustrating my improvements. Fig. 2 is a view in section on the line 2—2 of Fig. 1 showing a cooking utensil supported on the grid and plate. Fig. 3 is a fragmentary view in bottom plan. Fig. 4 is an exaggerated view in section on the line 4—4 of Fig. 3. Fig. 5 is a fragmentary view in section on the line 5—5 of Fig. 4, and Fig. 6 is a view in transverse section on the line 6—6 of Fig. 3.

1 represents a plate which is provided at its edges with flanges 2 to support the plate on any ordinary gas stove. The plate 1 is provided with an opening 3, and with an integral depending apron 4 around the opening. This apron 4 operates as a casing to receive the heat from the ordinary gas burner 5 and direct it through the opening 3 against a cooking utensil 6.

7 represents an open grid which is circular in form and fits within the opening 3. This grid 7 is provided with a series of depending lugs 8 which rest upon cam surfaces 9. These cam surfaces 9 are curved and are so arranged that when the grid is turned, the cam surfaces 9 will compel the grid to elevate as shown in Fig. 6, or lower as shown in Fig. 2 in accordance with the direction of movement.

When the grid is in its lowest position with the lugs 8 at the lowest points of the cam surfaces 9, the grid will be flush with plate 1, and as all ordinary cooking utensils are of appreciably greater diameter than the grid, they will cover the opening 3 and prevent any possibility of enveloping heat, but receive only the direct heat from the burner against the bottom of the utensil. When, however, the grid is turned so that the lugs 6 ride up the cam surfaces 9, the grid will be elevated and the cooking utensil will be supported above plate 1. When in this position, the heat from the burner will escape through the opening 3 and envelop the cooking utensil, and as it is desirable to have both forms of heat transmission, namely "direct heat" against the bottom and also "enveloping heat," I have provided an improved means by means of which this result may be had.

In the apron 4, I provide an opening 10 which is normally closed by a sliding door 11. This door 11 is connected to a curved bar 12 which is movable through guides 13, and is provided with an arm 14 extending beyond one end of plate 1 and movable in a recess 15 in flange 2.

On the door 11, I locate a forked lug 16 which straddles a depending finger 17 on the grid, so that when the door is moved to open position, the grid will be lowered, and when the door is moved to closed position, the grid will be elevated. The reason for this is apparent, because when the grid is elevated, the entire heat from the burner is utilized on the utensil supported by the grid, and when the grid is lowered, the surplus of heat may be allowed to escape through the opening 10 and utilized for any other purpose desired and give what is known as "flat heat." It will also be noted that the radial ribs 7$^a$ of the grid 7 are slightly higher than the circular portions 7$^b$ of the grid, so that the flame and heat from the burner can pass between the bottom of the cooking utensil and the grid, and utilize the greatest possible amount of heat in direct contact.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. The combination with a plate having a circular opening therein, and a depending apron around the opening having an opening in the wall thereof, a door normally closing the opening in the apron, a grid located in the opening, and means constructed to move the door and turn the grid, and supporting means for the grid compelling the latter to elevate when the door is closed, and lower when the door is opened, substantially as described.

2. The combination with a plate having a circular opening therein, and a circular series of cam surfaces located around the opening, a circular grid fitting the opening and having projecting devices supported on the cam surfaces, a circular depending apron around the opening, said apron having an opening in the wall thereof, means compelling the door and grid to move together, whereby the grid is elevated when the door is closed, and lowered when the door is open, substantially as described.

3. The combination with a plate having a circular opening therein, and a circular series of cam surfaces located around the opening, a circular grid fitting the opening and having projecting devices supported on the cam surfaces, a circular depending apron around the opening, said apron having an opening in the wall thereof, a depending device on the grid, a device on the door engaging the device on the grid, whereby the movement of the door to closed position causes the elevation of the grid, and the movement of the door to open position permits the lowering of the grid, substantially as described.

4. The combination with a plate having a circular opening therein, and a circular depending apron around the opening, said apron having an opening in the wall thereof, a door normally closing the opening in the apron, means for moving the door, a grid located in the opening in the plate, said plate having a circular series of cam surfaces supporting the grid, and devices connecting the door and the grid, whereby the movement of the door causes the rotary movement of the grid, substantially as described.

In testimony whereof I have signed my name to this specification in the presence of two subscribing witnesses.

GEORGE W. PEARCE.

Witnesses:
MARIE JACKSON,
CHAS. E. POTTS.

Copies of this patent may be obtained for five cents each, by addressing the "Commissioner of Patents, Washington, D. C."